(No Model.)
C. C. COLEMAN.
DOUBLE MOLD BOARD PLOW.
No. 284,820. Patented Sept. 11, 1883.
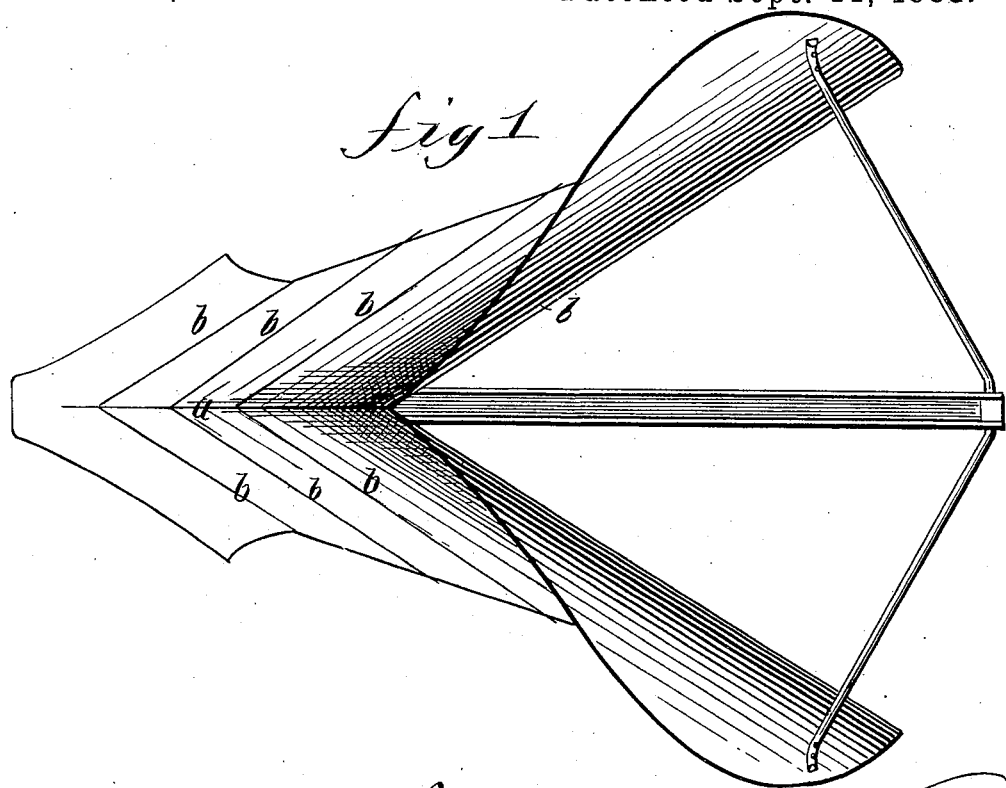
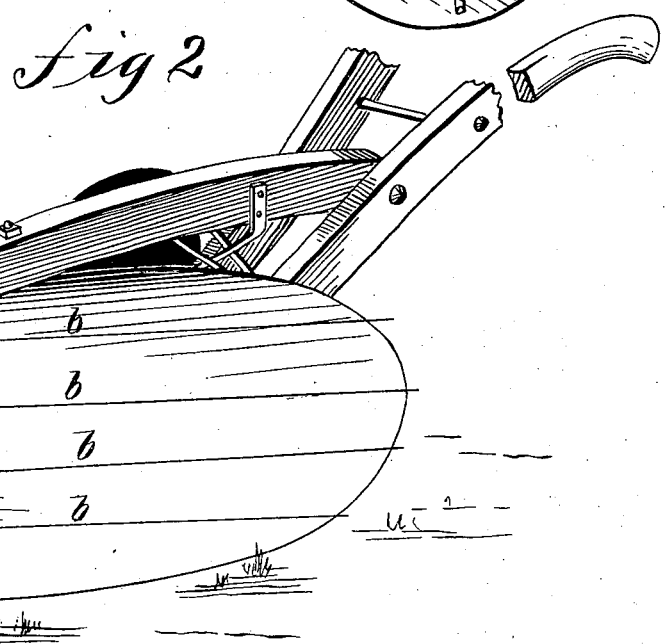
WITNESSES:
J. D. Garfield
C. Sedgwick
INVENTOR:
C. C. Coleman
BY Munn & Co
ATTORNEYS.

UNITED STATES PATENT OFFICE.

CHARLES C. COLEMAN, OF HONOLULU, OAHU, HAWAIIAN ISLANDS.

DOUBLE-MOLD-BOARD PLOW.

SPECIFICATION forming part of Letters Patent No. 284,820, dated September 11, 1883.

Application filed March 2, 1883. (No model.)

*To all whom it may concern:*

Be it known that I, CHARLES C. COLEMAN, of Honolulu, Oahu, Hawaiian Islands, have invented a certain new and Improved Double-Mold-Board Furrowing-Plow, of which the following is a full, clear, and exact description.

The object of the invention is to make a furrow twelve to sixteen inches deep in previously plowed and prepared land for planting sugar-cane.

My invention consists of a double-mold-board furrowing-plow, constructed in straight lines from the front to rear—that is to say, at any level above the share the lines of the mold-boards are straight from the front to the rear, instead of concave, as heretofore made, whereby the draft is much easier, and the mold-boards clear better and avoid clogging of earth, as in the concavity of plows as ordinarily made. I also extend the mold-boards higher and lower, and also farther backward, for preventing the earth from running over or beneath the mold-board back into the furrow when plowing deeply, and for enabling the angles of the boards to be sharper for a given width of furrow, all as hereinafter fully described.

Reference is to be had to the accompanying drawings, forming part of this specification, in which similar letters of reference indicate corresponding parts in both figures.

Figure 1 is a top or plan view of my improved plow, and Fig. 2 is a perspective side view.

The essential feature of my improvement in double-mold-board plows, consists in the construction of said mold-boards on straight horizontal lines $b$ from the apex $a$ to the rear ends of said boards—that is to say, at any point from the share upward the horizontal lines of the boards are straight, instead of concave, on the front or outside, as such plows have always been heretofore made. This form presents the same angle to the earth all the way from front to rear, and is therefore better because of being uniform, but more particularly because it avoids the greater angle along the rear part that must be when the angle at the front is lessened by the concave form, which causes the earth to clog on the rear part until it fills up the concave to a straight line, making the plow draw very hard, not only by the greater friction of earth which does slide off, but because of the great mass of earth that is pushed ahead of the plow by reason of the resistance of the mold-board.

I have found by actual use of this improved form of plow that it clears readily in soil that cakes on the plow of the ordinary form. By extending the breadth and length of the mold-board, as before stated, I am enabled to make cleaner furrows by preventing any earth from falling into the furrow, and I lessen the angle and make the plow draw still easier.

Having thus described my invention, I claim as new and desire to secure by Letters Patent—

The double mold-board of a furrowing-plow, having the horizontal straight lines $b$ extending from the apex $a$ to the rear, whereby the usual concavity, which is liable to be clogged, is avoided, and the draft thereby greatly reduced.

CHARLES C. COLEMAN.

Witnesses:
CHAS. R. SCARBOROUGH,
HARRY F. LEWIS.